No. 715,987. Patented Dec. 16, 1902.
R. M. CONNABLE.
TIRE FASTENING.
(Application filed Oct. 21, 1902.)
(No Model.)

Witnesses.
H. J. Meyer, Jr.
G. F. Vogt.

Inventor.
Ralph M. Connable
By Mann & Co.
Attorneys.

UNITED STATES PATENT OFFICE.

RALPH M. CONNABLE, OF BALTIMORE, MARYLAND.

TIRE-FASTENING.

SPECIFICATION forming part of Letters Patent No. 715,987, dated December 16, 1902.

Application filed October 21, 1902. Serial No. 128,184. (No model.)

*To all whom it may concern:*

Be it known that I, RALPH M. CONNABLE, a citizen of the United States, residing at Baltimore, State of Maryland, have invented certain new and useful Improvements in Tire-Fasteners, of which the following is a specification.

This invention relates to elastic tires for vehicle-wheels, and especially to that class of tires in which the rubber or rubber composition portion of the tire is retained on a channeled rim secured to the felly of the wheel either by means of a tie-band or tie-wires embedded in the tire or by shoulders formed by the inwardly-extending side edges of the channeled rim, or by both the tie bands or wires and said shoulders acting conjointly.

The object of this invention is to provide for a tire of this character a novel construction of fastening which will act to press the tire outwardly against its retaining means and which can be adjusted to the required degree of tension whenever desired.

The invention consists of certain constructions and arrangements of parts hereinafter fully described and claimed, reference being had to the accompanying drawings, in which—

Figure 1:
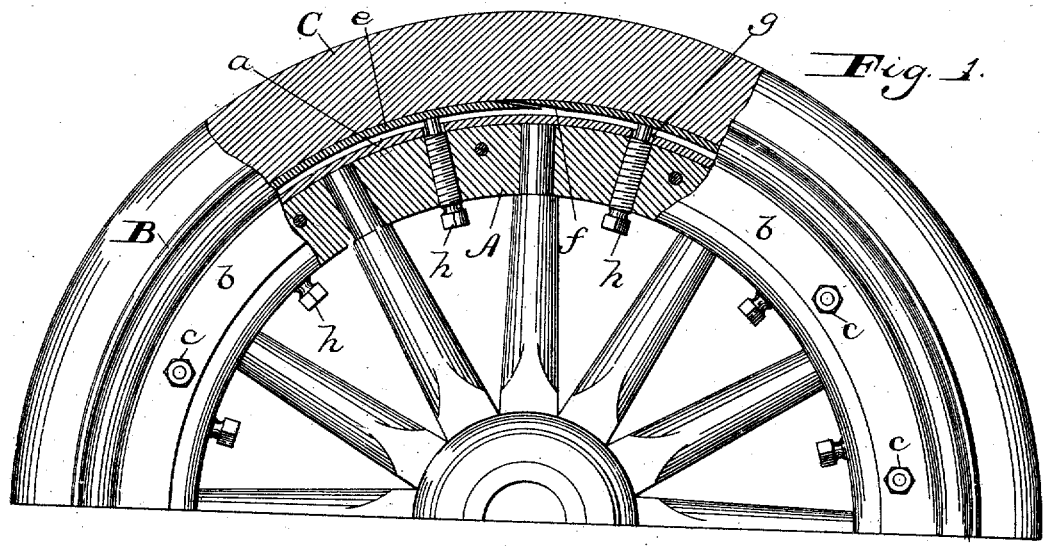
Figure 2:
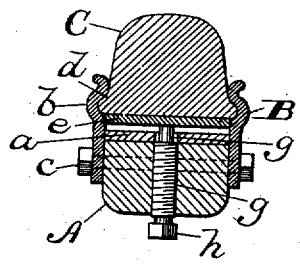
Figure 3:
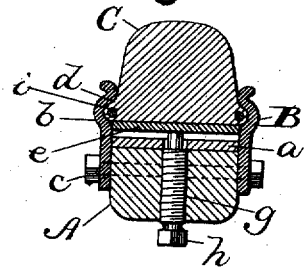
Figure 4:
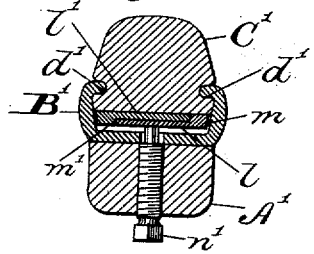
Figure 5:
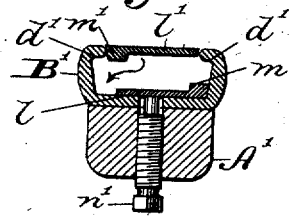

Figure 1 is a side view, partly in section, of a portion of a vehicle-wheel provided with the tire-fastening of this invention. Fig. 2 is a transverse section thereof, taken approximately on the line 2 2 of Fig. 1. Fig. 3 is a similar view illustrating a slightly-different construction. Fig. 4 is a transverse sectional view illustrating another different construction. Fig. 5 is a similar view with the elastic tire removed and illustrates the manner of inserting the pressure-band, hereinafter referred to, in the channeled rim of the wheel.

Referring to the drawings, Figs. 1 and 2, the letter A designates the felly of the wheel; B, a channeled rim consisting, in this instance, of a metal tire $a$, forming the bottom of the channel, and two circular side plates $b$, secured by bolts $c$ to the felly, one at each side of the metal tire, and said side plates provided on their opposing faces with inwardly-extending retaining-shoulders $d$, and C designates the elastic tire, seated in said channeled rim and retained therein by the shoulders $d$, which take over an enlargement at the base of the tire, as illustrated in Fig. 2. Within the channeled rim B and between the base of the elastic tire and the bottom of the channel is located a preferably spring-metal band $e$, split or separated at one point to have overlapped beveled ends $f$, as illustrated in Fig. 1, and at suitable intervals around the wheel, in this instance between every two spokes, the bottom of the channeled rim B and the felly A are provided with registering holes $g$, through which work screw-threaded bolts $h$, whose outer ends impinge against the band $e$, so that the latter may be pressed outwardly to compress the tire in an outward direction against the retaining means, consisting of the inwardly-extending shoulders $d$. These bolts may be tightened from time to time, if desired, to maintain the requisite tension on the band $e$.

The construction illustrated in Fig. 3 is similar to the construction illustrated in Figs. 1 and 2, except that in addition to the inwardly-extending shoulders $d$ tie-wires $i$, embedded in the tire, are employed to retain the tire in the channeled rim against the pressure of the outwardly-acting band $e$.

It is manifest that to obtain the best results with this invention when the retaining means includes the inwardly-extending shoulders of the channeled rim the outwardly-acting band should be of a width sufficient to extend entirely across the channel, so that the band will act at the point of greatest resistance—that is, directly under the shoulders. With the construction illustrated in Figs. 1, 2, and 3 this problem is readily solved, because the said band may be put in place before the side plates $b$ are fastened on, and hence the band does not have to be inserted between the shoulders $d$, which of course form a space between them narrower than the bottom of the channel; but when the channeled rim is formed in one integral piece, as illustrated at B', Figs. 4 and 5, the problem is presented of how to insert the band between the retaining-shoulders $d'$ and at the same time have a band sufficiently wide to obtain the best pressure on the tire at the points directly underneath said shoulders. I have solved this problem satisfactorily by forming the band in two overlapping sections $l$ $l'$, each of such a width that it will pass between the two shoulders, as illustrated in Fig. 5, and each provided at opposite edges with an oppositely-extending flange, (designated *m* and *m'*, respectively,) said flanges being beveled or inclined, so that when the outer section lies upon the inner section said inclines will tend to spread the said two sections apart in a lateral direction. While the width of each section, as before stated, approximates the space between the two shoulders *d'*, the combined width of the two sections when lapping joint, as illustrated in Fig. 4, is greater than the said space and is approximately equal to the full width of the channel. It is of course to be understood that each of the said sections is split at one end similar to the single integral band *e*, before described. The bolts *n'*, acting through the felly A' against this sectional band, produce the same outward compression of the tire C' as the bolts *h*, hereinbefore described.

Having thus fully described my invention, what I claim as new, and desire to secure by Letters Patent, is—

1. The combination with a vehicle-wheel provided with an elastic tire and retaining means for the tire, of a tire-fastening comprising a band encircling the wheel within the circle of the base of the tire; and adjustable bolts adapted to press said band outwardly whereby to compress the tire outwardly against the said retaining means.

2. In a vehicle-wheel, the combination with a channeled rim, an elastic tire seated in said rim, and retaining means for the tire, of a tire-fastening comprising a band located in said channeled rim, between the bottom of the same and the base of the tire; and a plurality of bolts working through the felly of the wheel and through said rim and impinging against said band whereby to press the latter outwardly against the tire-retaining means, as set forth.

3. In a vehicle-wheel, the combination with a channeled rim provided with inwardly-extending shoulders, and an elastic tire seated in said rim and retained therein by said shoulders, of an encircling band interposed between the tire and the bottom of the channel and constructed in overlapping sections each of which is capable of insertion into the channel between said shoulders, and the combined width of said sections being greater than the space between said shoulders; and means for pressing said band outwardly against the tire.

4. In a vehicle-wheel, the combination with a channeled rim provided with inwardly-extending shoulders, and an elastic tire seated in said rim and retained therein by said shoulders, of an encircling band interposed between the tire and the bottom of the channel and constructed in overlapping sections each of which is of a width less than the space between said shoulders and said sections provided at opposite sides with oppositely-extending flanges inclined on one side, said inclines tending to spread said sections apart laterally, and the combined width of said sections being greater than the space between said shoulders; and means for pressing said band outwardly against the tube.

5. In a vehicle-wheel, the combination with a channeled rim provided with inwardly-extending shoulders and an elastic tire seated in said rim and retained therein by said shoulders, of an encircling band interposed between the tire and the bottom of the channel and capable of a reduction and increase in width whereby it may be inserted between said shoulders and spread laterally after such insertion; and means for pressing said band outwardly against the tire.

In testimony whereof I affix my signature in the presence of two witnesses.

RALPH M. CONNABLE.

Witnesses:
G. FERDINAND VOGT,
FREDERICK S. STITT.